United States Patent [19]

Pedone

[11] 4,032,453
[45] June 28, 1977

[54] OIL-WATER SEPARATOR

[76] Inventor: Vito S. Pedone, Box 2733, Arlington, Va. 22202

[22] Filed: May 15, 1975

[21] Appl. No.: 577,895

Related U.S. Application Data

[62] Division of Ser. No. 492,168, July 26, 1974, Pat. No. 3,913,513.

[52] U.S. Cl. .................... 210/266; 210/290; 210/291; 210/435; 210/456; 210/502
[51] Int. Cl.² ........................................ B01D 39/04
[58] Field of Search .................. 210/40, 260–266, 210/290–291, 446, 456, 502, 503, 488, 402, DIG. 25, DIG. 26

[56] References Cited

UNITED STATES PATENTS

| 3,617,551 | 11/1971 | Johnston et al. | 210/40 X |
| 3,756,948 | 9/1973 | Weinberg et al. | 210/40 X |
| 3,852,193 | 12/1974 | Jakubek et al. | 210/290 X |
| 3,913,513 | 10/1975 | Pedone | 210/290 X |

Primary Examiner—Thomas G. Wyse
Assistant Examiner—Richard W. Burks
Attorney, Agent, or Firm—Beall & Jeffery

[57] ABSTRACT

The water and oil that is normally collected in the bilge of small boats is pumped overboard by a bilge pump with the oil being removed from the bilge water by a filter having layers of different size expanded resin particles that are hydrophobic and oleophilic. When operation of the bilge pump ceases, a valve will release the back pressure that would otherwise be caused by the filter, to facilitate start-up of the pump. At the discharge and visible on the exterior of the boat, there is an indicator that will change color when it is in contact with oil, to provide a visual indication when the filter needs changing.

7 Claims, 5 Drawing Figures

OIL-WATER SEPARATOR

This is a division of application Ser. No. 492,168 filed July 26, 1974, now U.S. Pat. No. 3,913,513 issued Oct. 21, 1975.

BACKGROUND OF THE INVENTION

In 1973, there were approximately 1,213,000 small boats, which would have a length of less than 65 feet, in Canada and the United States as determined by the United States Coast Guard and State Marine Registries that have inboard engines. The present invention is designed to be used with these small boats having inboard engines, to remove the oil from the bilge water and other water that is discharged overboard by the boats to prevent pollution of the environment.

The Federal Water Pollution Control Act (FWPCA) prohibits the discharge of oil or hazardous substances into the waters of the United States. This prohibition is stated in terms: "discharge" includes spilling, leaking, pumping, pouring, or dumping; and "oil" means any kind of oil in any form, including fuel oil, gasoline, lubricating oil, and oil mixed with water in a vessel's bilge. The United States Coast Guard and Environmental Protection Agency Standards states that oil has been discharged in a harmful quantity if it causes a visible shinning rainbow or discoloration of the surface of the water.

At the present time, boats with inboard engines commonly have bilges that collect water, fuel oil, gasoline, and lubricating oil. For safety purposes, a bilge pump is operated to pump this mixture overboard prior to starting of the engine, and during operation of the engine, the bilge pump is periodically operated to further remove the combination of bilge water and oil. Commonly, this will result in the discharge of a harmful quantity of oil as determined by the above standards.

One way that has been suggested to meet the above standards is to provide a holding tank within the boat, into which the bilge water and oil is pumped during operation of the boat, so that upon docking, the bilge water with oil will be pumped to an onshore system. For safety reasons, the bilge water and oil must be removed from the engine compartment in some manner during operation and during start-up of the engine to prevent explosions and fires.

Large oil, water separaters have been provided for large ships, but the size and cost of these systems generally prohibit their use on small recreational boats and small commercial boats of the type described above. Further, such systems are mainly concerned with recovering bulk oil and not with removing small quantities of oil, so that they would no doubt be incapable of meeting the above standards. Further, such systems could not operate with a conventional small boat bilge pump, because such pumps are extremely sensitive to back pressure and the pumps would fail to start-up, so that their associated motors would quickly burn out and a general failure of the system would result. Bilge pumps for small boats are manufactured to pump a volume of liquid within the range of three hundred (300) gallons per hour to one thousand four hundred (1,400) gallons per hour. Normally, there is one pump for each boat, depending upon the size of the boat and the compartmentation of the bilge-ballast area. These bilge pumps are commonly used with small boats having inboard engines, which include the following types: inboard, houseboat, inboard-out drive, yacht, and commercial.

SUMMARY OF THE INVENTION

The present invention relates to a filtering system for removing small quantities of oil from water, particularly for use with small boats, although according to the broader aspects of the present invention, it may be used for other installations, such as industrial installations and swimming pool filter systems to remove body oils and sun tan lotion oils that would otherwise grow algae and discolor the water within the swimming pool.

The present invention is particularly suitable for use with small boats having inboard engines, wherein the conventional bilge pump is installed in series with a filter, a back pressure relief valve, and a visual indicator. After operation of the bilge pump, the back pressure that has been created between the filter and the pump is relieved by the valve, so that upon start-up, the bilge pump will be able to start-up without any back pressure. The filter is provided with alternate layers of large particle expanded resin material and small particle expanded resin material; it has been found that the use of only large particles will not sufficiently remove the oil to satisfy the new standard for discharge of oil into the waters of the United States, and it has further been found that the use of only small particles that would meet these standards, will quickly result in a failure of the filter by the water forming channels through the small particles so that the water will bypass the material and discharge its oil directly overboard. With a combination of large and small particles, it has been found that the large particles will permit the dispersion of the flow transverse to the general flow direction for distributing the flow, while the layer of small particles will satisfactorily remove the oil from the flowing water and be of a length in the direction of flow short enough to prevent channeling. The synthetic resin material that is chosen for the particles is preferably expanded polyurathane that will pick up between 50 and 70 times its weight in oil, without materially changing in size. With the material being tightly confined within a filter unit to prevent channeling, this ability to maintain its particle orientation and size while picking up oil is extremely important.

For purposes of law enforcement and routine maintenance, a visual indicator is provided at the discharge end of the system, where the clean water is discharged overboard. The indicator will include a material that will pick up the oil and change in color, so that when the filter fails upon being saturated with oil, the oil that is then passed through the filter will quickly discolor the indicator to show that the filter should be replaced.

With the above-mention system, under actual test conditions, it is been shown that the water discharged overboard leaves no visible sheen, rainbow, film or discoloration of the surface of the open water. In addition, the water pumped overboard meets the United States Coast Guard and Environmental Pollution Agency Standard in which the oil is removed to at least 10 parts per million.

BRIEF DESCRIPTION OF THE DRAWING

Further objects, features and advantages of the present invention will become more clear from the following detailed description of a preferred embodiment, as shown in the accompanying drawing, wherein.

The preferred embodiment of the present invention is designed to be used in combination with small boats with inboard engines, with small boats being defined as commercial and recreational boats having a length generally less than 65 feet, which boats have problems peculiar to their size. According to the broader aspects of the present invention, the fluid system may be used with a standard filtration system for a swimming pool to remove the oils normally found in swimming pool water from sources such as sun tan lotion, and normal body oils, which oils tend to promote the growth of algae that will discolor the water and require higher concentrations of chlorine or similar material.

Figure 1:
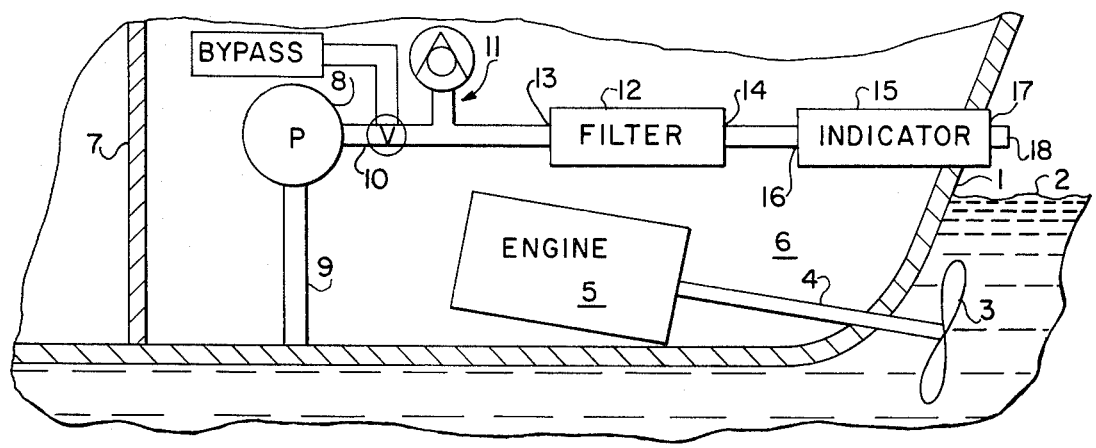
FIG. 1 is a cross-sectional, somewhat schematic, view of a small boat employing the features of the present invention.

With respect to the preferred embodiment as shown in FIG. 1, only a portion of a small boat is shown, because the boat may be of any small boat design and the actual design of the small boat forms no part of the present invention. The small boat includes a hull 1 that extends partially above the normal water line 2 and partially below the normal line. For propulsion of the boat, there is a driven propeller 3 below the water line, which is drivingly connected to a drive shaft 4 that passes through the hull 1 and is connected at its inboard end to an inboard engine 5. The engine 5 is mounted within an engine compartment 6, which in the particular example of a boat design is formed by the hull 1 and a partition 7. In a conventional manner, bilge water and oil from the engine is collected in the bottom of the engine compartment 6, which oil may be obtained from bearing grease, engine lubricating oil leakage, gasoline leakage, and the like. In a conventional small boat, the bilge water and oil is pump overboard by a bilge pump prior to starting the engine, to remove the hazards of an explosion or fire caused by igniting of the oil that is mixed with the bilge water, and further the bilge pump is conventionally operated whenever needed to remove bilge water and oil during operation of the engine.

According to the present invention, the bilge pump 8 has an inlet connected to an inlet pipe 9 that extends from the bilge pump 8 to closely adjacent the lower most portion of the engine compartment, so that the bilge pump 8 may suck bilge water and oil into the pump and discharge the same at a higher pressure through a pump outlet 10. The pump outlet 10 is fluid connected to a pressure relief valve 11, which is more fully shown in FIG. 5, which will maintain the pressure of the bilge water and oil passing through the bilge pump outlet 10 without discharging the bilge water and oil into the engine compartment during normal operation of the pump, and further which will permit relief of this pressure at the pump outlet 10 when the pump is shut down. The relief valve 11 is so constructed that it will vent the pump outlet 10 to the atmosphere within the engine compartment after the pump has been shut down and during start-up of the pump, that is, the relief valve 11 will not close until after normal pressure has been obtained at the pump outlet 10 as a result of normal pump operation or rated speed of the motor (not shown) drivingly connected to the pump.

Figure 2:
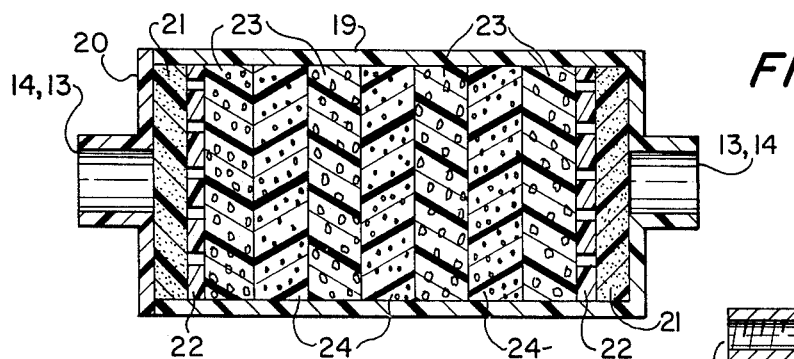
FIG. 2 is a longitudinal cross section through a disposable filter of the present invention.
Figure 3:
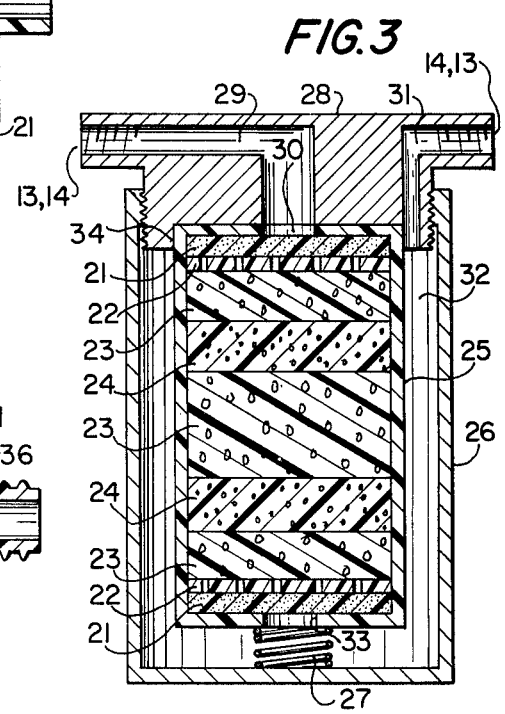
FIG. 3 is a longitudinal cross sectional view taken through a permanent filter housing containing therein a disposable filter cartridge, that would be used in place of the filter as shown in FIG. 2 for the combination of FIG. 1.

After leaving the vicinity of the back pressure relief valve 11, the pumped high pressure bilge water and oil travels to the filter 12 that may be of the type shown in FIG. 2 or shown in FIG. 3, where the bilge water and oil entering the inlet 13 will be filtered so that only bilge water will leave under pressure through the filter outlet 14 until such time as the filter 12 becomes saturated with oil. The thus filtered bilge water, which is now clear of oil, will enter the inlet 16 of an indicator 15, to leave the indicator at 17 for discharge through the outboard nozzle 18. The indicator 15, which is more fully shown in FIG. 4, includes a material that will discolor or change in color when it is in contact with small quantities of oil, which color will be visible from the exterior of the boat to give an indication that oil is passing through the filter, which occurs as a result of saturation of the filter. With the present invention under actual tests, a normal filter should last one boating season, and if the boat is used yearround, two filters may be required. The indicator will provide an indication to the boat owner or operator that the filter needs changing, and it will also provide an indication to law enforcement agencies that the boat is discharging a significant amount of oil overboard, even though the bilge pump may not be working at the time the inspection is made.

A disposable filter 12 is shown in more detail in FIG. 2, wherein there is provided a one piece housing 19 that is preferably molded from a synthetic resin so as to provide at one end a nipple that may be used as either the inlet 13 or the outlet 14 of the filter unit, which may in turn be provided with internal or external threads, or external ridges to engage a hose clamped about the nipple, which securement features are not shown since they may be of any conventional type. The other end of the housing 19 is closed by means of an end plate 20 that may be heat sealed or otherwise bonded to provide a fluid tight connection with the housing 19. The end plate 20 further has an integral nipple that may provide the inlet connection 13 or the outlet connection 14, in a corresponding manner. Preferably, the end plate 20 is molded in one piece from a synthetic resin or metal. The material that fills the interior of the chamber formed by the housing 19 and end plate 20 is of a construction that is symetrical with respect to the opposed ends, so that the filter is reversible in installation to simplify installation and to simplify construction. Immediately adjacent each end, there is a layer of a sheet of synthetic resin foam that will freely pass both oil and water, preferably without absorption of the oil to any material extent. Immediately adjacent and to the interior of the sheet foam layer 21, there is a deflector or baffle plate 22, that is preferably formed by a solid sheet of synthetic resin having a plurality of axially extending holes or perforations, which plate in combination with the sheet foam will provide for even distribution of the liquid across the entire extent of the sheet, that is, the liquid entering the inlet 13 will be dispersed radially outward for even distribution across the entire cross-section of the housing 19. Again, the oil and water will pass through the plate 22, without any significant retention. The fluid will then pass through alternate layers of large particle expanded synthetic resin 23 and small particle expanded synthetic resin 24. After passing through these alternate layers 23, 24, where the oil is removed from the bilge water, the filtered water will pass through the opposite end deflector plate 22, which will now function mainly to hold back the bulk of the large particles within the layer 24. Thereafter, the filtered water will pass through the sheet foam layer 21, which will serve to permit relatively free radial travel of the filtered water inwardly towards the outlet 14 and further prevent passage of any small particles of the expanded resin.

The particular oil absorbent filter material has an extremely high absorption capability with respect to oil and can absorb approximately 50 to 70 times its own weight in oil. The material is also non-leaching so that regardless of the passage of time, the oil will not return to the water after it has been absorbed by the resin. Also, the material does not significantly change in size or composition when mixed with oil even to the point of saturation, and this material is non-toxic so that no adverse chemicals are added to the water that is discharged from the boat. While being oleophilic, the material is hydrophobic due to the difference in surface tension between oil and water with respect to the pores of the expanded resin.

As one method of constructing the filter material, polyurethane is expanded to form a rigid foam according to a conventional process, and thereafter a Pullman type of cutting mill, which is a knife mill employing three sharp rotating blades, is used to chop the rigid polyurethane foam into small granules or particles, which are thereafter passed through screens to obtain the large particles for the layer 23 and the small particles for the layer 24. The actual cutting of the rigid foam has been found to be critical with respect to obtaining maximum oil absorption, which is as high as 50 to 70 times the weight of the resin. This has been found to be true because a grinding or crushing to obtain the particles will result in closed cell particles, because grinding will produce sufficient heat to heat seal or self-skin the cells, even though the cells are reduced in size, and crushing will merely reduce the size of closed cells without opening them up. In contrast, cutting of a closed cell will open up one wall of the cell for free access of oil to the interior of the cell, and greatly increase the surface area of the resin exposed to the oil. In fact, the method of forming the particles, for maximum oil absorption, is so critical that even dull blades of a Pullman type cutter mill will generate sufficient heat to close off the cells and significantly reduce the oil absorption capacity of the particles. It has been found that the preferred range of particle size is from 1,600 microns to about 10,000 microns. It has been found that when an expanded rigid synthetic resin has been processed according to the present invention through a Pullman cutter mill with sharp blades, it will absorb approximately 400% more oil than when processed through a grinder to produce the same sized particles. A physical examination of the cross section of cut material according to the present invention will show that the cut face exposes an undistorted cell interior. The resulting particles have a density of approximately 3 pounds per cubic foot.

The particles that have been obtained by the foregoing method are passed through selected screens to first provide fine or small sized particles of 2,000 microns or smaller, and thereafter produce large size particles falling within the range of 5,000 microns to 2,000 microns.

In actual experiments, it has been found that if only the larger size particles where used, the oil and water would have a satisfactory distribution throughout the interior of the filter, but small quantities of oil would pass through the filter long before saturation is reached, so that discharge of the filtered water would produce a visible sheen on the surface of open water and not meet the standards discussed above. Further, actual experiments have shown that if the smaller particle material was used (that is having a size of 2,000 microns or less) all of the oil would be satisfactorily removed from the water initially, but very quickly the water passing through the filter would form channels through the smaller particles so that there would be very little contact between the particles and oil resulting in passage of oil through the filter to produce a visible sheen upon the open water where the filtered water is discharged long before the filter became saturated; in fact, with the smaller particles, the walls of the formed channels would absorb oil but the interior particles removed from the channels would not be in contact with the moving oil and water, so that absorption would be greatly hindered. The water and oil passing through a filter with smaller particles will almost immediately form channels to result in failure of such a filter. According to the present invention, it has been found that alternating layers of large particle filter material (particles falling within the range of approximately 2,000 to 5,000 microns) with layers of small particles of filter material (particles having a size of 2,000 microns or less) will evenly distribute the flow of liquid throughout the filter so that uniform saturation of the filter material will proceed from the inlet to the outlet to provide for maximum oil absorption and saturation of the filter before the filter will fail and pass oil, and further the smaller particles will satisfactorily remove the oil to meet the afore mentioned requirements and standards. It has been found in actual tests, that the filter will operate until substantially all of the filter material is saturated with oil, without forming any channels even in the layers of smaller particle materials, when the smaller and large particle layers are alternated as shown. Preferably, it has been found most desirable to provide the small particle layers with a length, in the general direction of fluid flow, that is between 2 and 4 times as long as the length of the large particle layer, and most preferably three (3) times as long. It is felt that the function of these layers is as follows: the large particles will, in addition to absorbing oil, evenly distribute the liquid flow throughout the transverse cross section of the filter to prevent subsequent channeling in the small particle layers, and the small particles will all be in contact with the moving liquid due to such distribution, and further will be very efficient in removing the oil from the liquid due to their small particle size so that no oil will be passed beyond the standards mentioned above until saturation is reached. The number of alternating layers will generally determine the life of the filter, and it has been found that filters approximately 4 inches in diameter and approximately 12 inches in length with alternating layers of 1 inch length large particles and 3 inch length small particles will serve to remove oil from the bilge water and satisfy the above mentioned standards throughout operation for a normal boating season, without saturation of the filter. Although in FIG. 2 the relative size of the alternating layers has not been indicated as falling within the above range, the above mentioned ranges are preferable.

The deflector plate 22 and sheet foam distribution layer 21 are not essential to the present invention, but they do not provide further advantages. Particularly, the deflector plate will initially evenly distribute the liquid across the transverse cross section at the interior to provide an even distribution of the presence of the liquid at the entrance, and the plate at the opposite end will assure maintenance of this distribution. Further, the sheet foam layer 21 will provide a spacing or manifold cavity for the deflector plate and in addition will prevent smaller particles of the filter material from traveling through the filter outlet 14. It is thus seen that each of the elements 21 and 22 provide a function at either the inlet or the outlet, which further facilitates the reversibility of the filter.

The alternating layers of different size particles further has an effect in reducing the back pressure on the bilge pump, and it has been found that with respect to conventional bilge pumps, the back pressure is a critical factor in bilge pump failure. The physical size of the filter will also depend upon the capacity of the bilge pump, and bilge pumps within the small boat field generally fall within the range of 300 gallons per hour to 1,400 gallons per hour.

Since the particles are preferably cut as described above, the large particle layer is a mass of particles with cut and rough side so that when the liquid hits the layer upon start-up, it will cause the irregular surfaces to lock together while diffusing the force of the fluid stream throughout the full area of the filter. The action of the course particles is very much like the action of trap rock used in road construction. As in a "french drain," the trap rock is compacted into place thus providing a solid base for a roadbed while permitting the free passage of water; the filtered alternating layer construction operates in much the same way with the larger particles forming a firm base for the smaller particle layer and distributing the flow evenly to the smaller particle layer. Thus, channeling and wash out is prevented in the smaller particle layer.

It has been found that the filter with these alternating layers will operate until saturation without forming channels, and without the smaller particles migrating into the larger particles, both of which faults would occur if the filter were made up of only smaller particles. Upon start-up of the bilge pump, the fluid force will hit the filter bed and compress the filter material much in the manner of a coil spring, but the entire mass will be compacted and moved in the direction of fluid a small amount without distributing the orientation or layering of the particles. When the fluid pressure is relieved by stopping the bilge pump, the mass of material will expand back generally into the original position thus freeing restrictions due to localized conditions and further to prevent the tendency to form channels.

Actual tests have shown that if the large particle material having a size between 2,000 and 5,000 microns is provided throughout the entire filter, no matter how tightly it is packed, it will allow oil to pass entirely through the filter because of the large percentage of voids between the particles without sufficiently contacting the absorbent material with the oil, so that contaminated liquid will be discharged from the filter in violation of the preceeding standards, starting very soon after the installation of a new filter, and long before saturation is reached. Of course, this problem would be even greater with larger sized particles.

On the other hand, if only the finer sized particles were used (having a size of 2,000 microns or less) throughout the entire filter, the following problems would occur: if the absorbent material were very firmly packed in an effort to prevent channeling, the restriction to the flow of fluid through the filter would be so great that the resulting back pressure would cause bilge pump failure very quickly. If the absorbent material of the smaller particles were lightly packed throughout the entire extent of the filter to reduce the back pressure to an acceptable level, channeling would occur where the liquid traveling through the filter would form easily recognized visible channels through the filter so that there would be insufficient contact between the oil and filter material so that very quickly the filter would pass contaminated liquid in violation of the above standards.

In FIG. 3, there is shown a permanent installation for the filter, which structure may be used in place of the structure shown in FIG. 2, so that either the filter of FIG. 2 or FIG. 3 may be used in the system of FIG. 1. In FIG. 3, a disposable cartridge 25 may be used that is identical to all of the structures shown in FIG. 2, except that it may or may not include the nipples described with respect to FIG. 2. Thus with respect to the disposable cartridge 25, identical numerals have been provided for structure that is identical to that described with respect to FIG. 2, and further description therefore of these elements will be unnecessary.

The disposable cartridge 25 of FIG. 3 is preferably contained within a permanent cup-shaped member 26 that may be constructed of metal. A coil spring 27 is provided between the lower end of the cartridge 25 and the cup-shaped housing 26, to provide a spacing between these two elements and permit flow of fluid into or out of the opening 33 of the cartridge 25. The other end of the cartridge 25 is held in place by means of a cap 28 that is externally threaded and secured to the open end of the cup-shaped housing 26 by internal threads on the housing 26. The cap 28 may be rigid plastic or metal, and is provided with a fluid passage 29 that opens to the side to provide either the inlet 13 or the outlet 14 of the filter and at its other end opens to the interior of the filter housing in alignment with the opening 30 of the cartridge 25. The cap 28 is further provided with a fluid passage 31 that opens on the opposite side of the cap 28 to provide either the inlet or outlet and at its other end opens to the annular passage between the cartridge 25 and substantially larger housing 26. This thus formed annular passage and the end space provided by the spring 27 form a chamber 32 to provide liquid to communication between the port 31 and the opening 33 exteriorly of the cartridge 25. The cartridge 25 is held in this central location to assure the formation of the chamber 32, by means of a recess 34 in the lower end of the cap 28, into which the upper end of the cartridge 25 is resiliently held to form a seal between the cartridge 25 and the end cap 28 while at the same time providing communication between the passage 29 and opening 30. Thus, it is seen that if the passage 29 were used as the inlet, fluid would pass through the opening 30, through the interior of the cartridge 25, through the opening 33, through the spring 27, through the chamber 32 and through the passage 31. The outlet end of each of passages 29 and 31 is provided with either internal, as shown, or external, not shown, threads for securing pipes or the like, or ridges may be provided for securing resilient hoses with hose clamps.

When it is desired to change the filter at the beginning of a season, or when saturation is reached as shown by the indicator 13, the housing 26 is easily unscrewed from the cap 28, so that the cartridge 25 may be thrown away and replaced by a new cartridge 25 without disconnecting any flow lines.

Figures 4, 5:
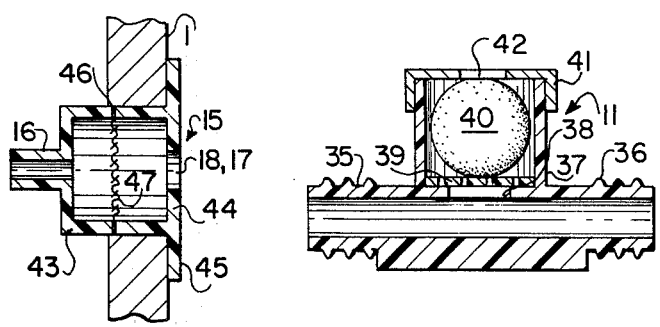
FIG. 4 is a cross sectional view taken through the visual indicator that is schematically shown in FIG. 1.
FIG. 5 is a cross sectional view taken through the relief valve that is schematically shown in FIG. 1.

The visual indicator as shown in FIG. 4 may be of many different types of construction, but is preferably formed by a one (1) piece molded synthetic resin generally cup-shaped member 43 having an inlet nipple 16, and a generally cup-shaped one piece molded synthetic resin member 44 that has an outer peripheral and radial flange 45, with an indicator material 47 clamped therebetween around the joining periphery 46 of the members 43 and 44. The member 44 is constructed of a transparent material that will permit viewing of the indicator material 47 from the exterior (to the right of FIG. 4) of the boat hull 1 substantially above the water line as shown in FIG. 1. The periphery 46 may be bonded by any conventional manner to provide a fluid tight closure and to securely hold the material 47 around its periphery. The material 47 may be a white cotton fabric that will quickly pick-up and be discolored or colored by any oil passing through the indicator 15 to provide a visual indication through the clear member 44 to the exterior of the boat hull 1 that the filter 12 is passing oil.

The relief valve of FIG. 5 has been found to be extremely important with respect to preventing early bilge pump failure. While the relief valve may take on many forms and may be chosen from a standard line of similarly operated valves, the preferred form of the valve is shown in FIG. 5, wherein a one piece synthetic resin member is molded with opposed connectors 35 and 36, which may have means on them for securing the fluid lines, for example, external ridges to engage resilient tubes that are provided with hose clamps. An upstanding annular wall 37 forms a valve chamber having at one end the opening 38 formed by a peripheral shoulder that supports a perforated retention plate 39, which plate in turn supports a float valve 40 that may be standard ping pong ball. The upper end of the valve chamber is closed by means of a cap 41, which may be constructed in one piece of a synthetic resin and bonded to the annular member 37. The cap 41 is provided with a circular opening 42 that may be formed with any type of sealing lip to cooperate with the float valve 40. In operation, the connectors 35 and 36 may function as either the inlet or outlet, so that when installed in the system of FIG. 1, the valve 11 will function to eliminate any back pressure on the bilge pump 8 during start-up, because initially the bilge pump 8 will be purging itself and the connecting lines of air, which air will freely pass through the valve 11 without passing through the considerable restriction of the filter 12 so that the pump 8 may start-up and reach its rated speed and start pumping liquid before there is any back pressure produced on the pump. Once liquid is pumped to the valve 11, the liquid will enter the valve chamber and force the float valve member 40 upwardly to seal the opening 42, so that thereafter all of the liquid pumped by the pump 8 must pass serially through the filter 12, indicator 15, and outlet 18 to be discharged to the open water surrounding the boat.

Upon shutdown, leakage will occur and the back pressure will be relieved through the valve 11, filter 12, and the pump 8, so that again upon start-up there will be no back pressure on the pump 8. In actual tests, it has been found that the commercially available bilge pumps are extremely sensitive to back pressure, and that the back pressure on these pumps is critical with respect to their early failure.

While the layering construction of the filter is quite important with respect to relieving back pressure, it has been found that the relief valve is even more important with respect to eliminating back pressure during start-up. In actual tests without the valve 11, it was found that the filter and any trapped liquid would many times provide sufficient back pressure to the pump 8 so that the pump would not start-up and the motor operating the pump would quickly burn out. It is known that motors draw the most current when they are starting-up and that pumps require considerable power during start-due due to the inertia of their movable parts, so that if back pressure were added to the pump, the total result is many times enough to prevent start-up of the pump and burn out the motor.

Since the operation of the individual parts has been described along with their construction, a separate operation will not be set forth in detail.

While the preferred embodiment relates to the system for removing bilge water from a boat and preventing the discharge of oil to meet the above mentioned standards, the illustrating system 9-18 may also be provided for other installations, for example within a swimming pool filtration system to remove suntan lotion oil and body oils from the water. If these oils were not removed they tend to support the growth of algae that will greatly discolor the water and require the addition of large quantities of chlorine and other substances that are generally undesirable. Further, the system could be used in industrial applications, for example where cooling water may pick up lubricating oil from machinery. These further uses are according to the broader aspects of the present invention.

Further, the system can be expanded to a size large enough to serve a marina and by having the boats by-pass their filters and pump directly into a header system and then into a larger dock side filter, and discharge the clean water back into the main body of water.

While a preferred embodiment of the present invention has been shown and described in detail for purposes of illustration and for the advantages of the specific details, further embodiments, modifications and variations are contemplated within the spirit and scope of the present invention, all as defined by the following claims:

I claim:

1. A filter for removing oil from water and discharging filtered water free from oil, comprising: a housing having an inlet and an outlet for the liquid; fluid distribution means within said housing for directing the fluid along a predetermined path between said inlet and said outlet; filter particles substantially completely filling said housing; a first mass of said particles, within said housing and in said path, having a size within a predetermined range and being of an expanded open pore oleophilic and hydrophobic rigid synthetic resin; a second mass of said particles, within said housing and in said path spaced in the direction of flow from said first mass, of a size within a range substantially less than the range of said first mass of particles, and being of expanded open pore olephilic and hydrophobic rigid synthetic resin; said smaller sized second mass of particles being interposed within said path between said larger sized particles and said outlet, so that said larger sized mass of particles will constitute means to distribute the fluid transversely of the path for even distribution and said smaller sized second mass of particles will constitute means to efficiently remove the oil from the water while passing the water; porous means interposed in said fluid path between said smaller sized second mass of particles and said discharge means with a plurality of through passages smaller than said smaller sized particle range of said second mass for passing the filtered water and blocking the passage of said smaller sized particles; and the particles of each of said first and second masses contain cut and uncut expanded resin cells, with the uncut cells being generally spherical and the cut cells being generally truncated spheres with undistorted open ends.

2. The filtration system of claim 1, wherein said larger sized particle first mass has a length, as measured in the direction of said fluid path, that is between two and four times as large as the corresponding length of said smaller sized second mass of particles.

3. The filtration system of claim 2, wherein said inlet and outlet are substantially identical to be interchangeable and said filter has a serial arrangement along the path of fluid flow, of distribution means, said particle containing porous means, a mass of said larger sized particles, a mass of said smaller sized particles, a mass of said larger sized particles, a second one of said particle containing porous means, and a second distribution means.

4. The filtration system of claim 1, wherein there are a plurality of immediately adjacent alternating layers of said larger sized first mass of particles and said smaller sized second mass of particles along and within said fluid path.

5. The filtration system of claim 4, wherein said larger sized particle first mass has a length, as measured in the direction of said fluid path, that is between two and four times as large as the corresponding length of said smaller sized second mass of particles.

6. The filtration system of claim 1, wherein said inlet and outlet are substantially identical to be interchangeable and said filter has a serial arrangement along the path of fluid flow, of distribution means, said particle containing porous means, a mass of said larger sized particles, a mass of said smaller sized particles, a mass of said larger sized particles, a second one of said particle containing porous means, and a second distribution means.

7. The filtration system of claim 2, wherein said inlet and outlet are substantially identical to be interchangeable and said filter has a serial arrangement along the path of fluid flow, of said particle containing porous means, a mass of said larger sized particles, a mass of said smaller sized particles, a mass of said larger sized particles, and a second one of said particle containing porous means.

* * * * *